(12) United States Patent
Lee et al.

(10) Patent No.: US 12,122,264 B2
(45) Date of Patent: Oct. 22, 2024

(54) CONTROLLER-INTEGRATED MOTOR MODULE FOR DRIVING OF POWER SEAT

(71) Applicant: DAS CO., LTD., Gyeongju-si (KR)

(72) Inventors: Kwang Sin Lee, Hwaseong-si (KR); Byung Yoon Choi, Seoul (KR)

(73) Assignee: DAS CO., LTD., Gyeongju-si (KR)

( * ) Notice: Subject to any disclaimer, the term of this patent is extended or adjusted under 35 U.S.C. 154(b) by 423 days.

(21) Appl. No.: 17/586,080

(22) Filed: Jan. 27, 2022

(65) Prior Publication Data

US 2022/0348115 A1 Nov. 3, 2022

(30) Foreign Application Priority Data

Apr. 28, 2021 (KR) .................. 10-2021-0055145

(51) Int. Cl.
*B60N 2/02* (2006.01)
*H02K 5/22* (2006.01)
(Continued)

(52) U.S. Cl.
CPC ....... *B60N 2/0244* (2013.01); *B60N 2/02246* (2023.08); *H02K 5/225* (2013.01); *H02K 7/003* (2013.01); *H02K 7/116* (2013.01); *H02K 11/0094* (2013.01); *H02K 11/33* (2016.01); *H02P 27/06* (2013.01); *B60N 2/02253* (2023.08); *F16H 1/203* (2013.01); *F16H 19/02* (2013.01)

(58) Field of Classification Search
CPC .............. B60N 2/0244; B60N 2/02246; B60N 2/02253; H02K 5/225; H02K 7/003; H02K 7/116; H02K 11/0094; H02K 11/33; H02P 27/06; F16H 1/203; F16H 19/02
See application file for complete search history.

(56) References Cited

U.S. PATENT DOCUMENTS

2010/0013285 A1* 1/2010 Stanz ................ F16H 25/20
297/344.13
2015/0084446 A1* 3/2015 Atar .................... H02K 11/215
310/43
(Continued)

FOREIGN PATENT DOCUMENTS

WO WO-2018139248 A1 * 8/2018 ............. H02K 5/00
WO WO-2019039845 A1 * 2/2019 ............. B60N 2/56

*Primary Examiner* — Jelani A Smith
*Assistant Examiner* — Nada Mahyoob Alqaderi
(74) *Attorney, Agent, or Firm* — Bridgeway IP Law Group, PLLC; Jihun Kim (57) ABSTRACT

Disclosed herein is a controller-integrated driving motor module. The controller-integrated driving motor module includes: a motor; a motor housing configured such that the motor is accommodated therein; a power transmission unit connected to the motor, and configured to transmit a rotational force of the motor to each part of a power seat for the movement of the power seat disposed in a vehicle; and a controller disposed between the motor and the power transmission unit, and configured to control the rotation of the motor. The controller includes a MCU configured to control the rotation of the motor, an inverter configured to receive a driving signal from the controller and drive the motor, and a power supply unit configured to receive power from the battery of the vehicle and provide the power to the controller.

7 Claims, 10 Drawing Sheets

(51) Int. Cl.
*H02K 7/00*     (2006.01)
*H02K 7/116*    (2006.01)
*H02K 11/00*    (2016.01)
*H02K 11/33*    (2016.01)
*H02P 27/06*    (2006.01)
*F16H 1/20*     (2006.01)
*F16H 19/02*    (2006.01)

(56) References Cited

U.S. PATENT DOCUMENTS

| | | | |
|---|---|---|---|
| 2017/0190265 A1* | 7/2017 | Nakayama | B62J 45/4152 |
| 2021/0155120 A1* | 5/2021 | Lee | B60N 2/02246 |
| 2021/0155121 A1* | 5/2021 | Byun | B60N 2/02246 |
| 2021/0394646 A1* | 12/2021 | Meguro | B60R 16/0215 |

* cited by examiner

CONTROLLER-INTEGRATED MOTOR MODULE FOR DRIVING OF POWER SEAT

CROSS-REFERENCE TO RELATED APPLICATION

This application claims priority from and the benefit of Korean Patent Application No. 10-2021-0055145, filed on Apr. 28, 2021, which is hereby incorporated by reference for all purposes as if fully set forth herein.

BACKGROUND

1. Technical Field

The present invention relates to a motor module for driving a power seat for a vehicle, and more particularly to a motor module that minimizes the size of a supervisory controller by including a circuit for driving a motor inside the motor module rather than in a separate supervisory controller provided in the outside.

2. Description of the Related Art

Vehicles are equipped with various convenience devices whose main purpose is to improve the convenience of a driver or a passenger. An example thereof is a power seat. In general, a seat for a passenger vehicle includes a seat back configured to support the back of a passenger, a seat cushion configured to allow a passenger to sit thereon, a head rest, and a leg rest. A power seat refers to a seat equipped with a device capable of electrically driving each part of the seat using a motor.

In this case, as devices provided in the power seat to change the seating posture of a passenger, there are being applied a reclining device mounted in a connection portion between a seatback and a seat cushion and a relaxation device that allows a reclining operation for the seatback and a forward movement and tilting operation for the seat cushion to occur simultaneously. In addition, some luxury vehicle seats are equipped with a leg rest device capable of supporting a passenger's legs. Furthermore, in order to support the legs more comfortably, there may be further provided with a leg rest extension device that is driven such that the length of a leg rest is extended toward a location in front of a seat at the same time as the leg rest rises in conjunction with the leg rest device. In addition to the devices mentioned above, a power seat may be further provided with a device for driving a headrest that supports the head. As described above, as the number of driving devices for a passenger's convenience increases, the number of motors for providing driving power also increases proportionally.

Conventionally, each seat has a separate supervisory controller disposed outside motors, and are electrically connected to the individual motors that drive respective parts of the seat. When a passenger's intention to operate a part of the seat is input through a seat interface (a button, or the like), the supervisory controller controls the movement of the seat by sending a signal adapted to control each motor in a forward or reverse direction.

However, as described above, as specifications are advanced, the number of motors increases, and accordingly, the scale of a driving circuit inside the supervisory controller also increases, so that there is a problem in that the volume of the supervisory controller increases. Therefore, the utilisation of a space is deteriorated because it is necessary to secure a wide space in which the supervisory controller is arranged for each seat.

In addition, in the case of the conventional method of driving the motors via the supervisory controller, whenever the number of motors increases by 1, a DC motor needs to be provided with a power line for connection to a Hall sensor as a circuit for transmitting a signal to drive the motor between the supervisory controller and the motor. In a wire harness connecting the controller and the motor, four connection wires are increased for each increased motor. In the case of a BLDC motor, a total of eight connecting wires for a Hall sensor and three-phase power lines, increases, so that there is a problem in that the burden of an increase in the volume of a wire harness is heavy.

Related Art Document

Patent Document: Korean Patent No. 10-1619619

SUMMARY

The present invention has been conceived to overcome the above-described problems, and an object of the present invention is to provide a motor module that may minimize the size of a supervisory controller even when the number of motors for controlling a seat increases, thereby allowing a space for the arrangement of vehicle seats to be advantageously utilized.

Another object of the present invention is to provide a motor module that may minimize the burden of an increase in the volume of a harness even when the number of motors for controlling a seat increases.

Another object of the present invention is to provide a motor module that is applicable to seat frames having various shapes without a concern about structural interference.

Still another object of the present invention is to provide a motor module that allows the size of a controller embedded in the motor module to be minimized by connecting neutral points in the outside without connecting the neutral points in the controller, thereby achieving reductions in size and weight.

In order to accomplish the above objects, the present invention provides a controller-integrated driving motor module including: a motor; a motor housing configured such that the motor is accommodated therein; a power transmission unit connected to the motor, and configured to transmit a rotational force of the motor to each part of a power seat for the movement of the power seat disposed in a vehicle; and a controller disposed between the motor and the power transmission unit, and configured to control the rotation of the motor; wherein the controller includes a controller configured to control the rotation of the motor, an inverter configured to receive a driving signal from the controller and drive the motor, and a power supply unit configured to receive power from the battery of the vehicle and provide the power to the controller.

The controller-integrated driving motor module may further include a connector configured to connect the controller to a supervisory controller that receives a driving command for the power seat; the connector may be detachably coupled to the controller; and the controller may be connected to the supervisory controller through the connector only over a communication line.

The motor may include a stator, including a core configured such that three-phase coils are wound thereon, a rotor including a magnet, disposed inside the stator and configured to rotate relative to the stator, and a rotation shaft disposed inside the rotor; the controller may be formed of a printed circuit board (PCB) on which circuit elements constituting the controller, the inverter, and the power supply are mounted; a rotation shaft passage hole formed in a size corresponding to that of the rotor and configured such that the rotation shaft passes therethrough and a plurality of motor coupling holes configured to be coupled to the motor are provided in the PCB substrate; and the controller may be connected to a plurality of coupling protrusions provided on one end portion of the stator through the motor coupling holes.

The motor housing may include: a main housing configured such that the motor is accommodated therein; and a connector housing protruding from the main housing in a direction perpendicular to the longitudinal axis of the main housing, and configured such that the connector is accommodated and coupled therein.

The power transmission unit may be formed in: a first shape including a first shaft extending from the rotation shaft of the motor and having a thread formed thereon and a first cylindrical gear connected to the first shaft having the thread, and further including a power transmission shaft connected to the first cylindrical gear and configured to rotate together when the first cylindrical gear is rotated; or a second shape including a second shaft extending from the rotation shaft of the motor and having a thread formed therein and a second cylindrical gear connected to the second shaft having the thread, and further including a lead screw connected to the second cylindrical gear and configured to linearly move when the second cylindrical gear is rotated.

The connector may be disposed: when the power transmission unit has the first shape, to correspond to a direction in which the first cylindrical gear is disposed with respect to the first shaft; or, when the power transmission unit has the second shape, to correspond to an axial direction in which the lead screw moves linearly.

The motor may include a stator on which three-phase wires are wound; a neutral point assembly part formed to protrude outward in the radial direction of the stator may be connected to one end of the stator in a longitudinal direction; and neutral lines of the three-phase wires may be inserted into the neutral point assembly part and may be then compressed and assembled through one common terminal.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

While the present invention may be subjected to various modifications and have various embodiments, specific embodiments are illustrated in the drawings and are specifically described in the detailed description for ease of description. This is not intended to limit the present invention to the specific embodiments, and it should be understood that the present invention includes all modifications, equivalents, and substitutes included in the spirit and scope of the present invention.

In the following description of the present invention, terms such as first, second, etc. may be used to describe various components, but the components may not be limited by the terms. The above terms are used only for the purpose of distinguishing one component from another. For example, without departing from the scope of the present invention, a first component may be referred to as a second component, and similarly, a second component may also be referred to as a first component.

The term "and/or" may include a combination of a plurality of related described items or any of a plurality of related described items.

When a component is described as being "connected" or "coupled" to another component, it is understood that they may be directly connected or coupled to each other or they may be connected or coupled to each other with a third component disposed therebetween. In contrast, a component is described as being "directly connected" or "directly coupled" to another component, it is understood that they are connected or coupled to each other without a third element therebetween.

The terms used in the present application are used only to describe specific embodiments, and are not intended to limit the present invention. A singular expression may include a plural expression unless the context clearly dictates otherwise.

In the present application, it may be understood that terms such as "include" or "have" intends to specify the presence of a feature, a fixed number, a step, an operation, an element, a component, or a combination thereof described in the specification, but does not exclude the possibility of presence or addition of one or more other features, fixed numbers, steps, operations, elements, components, or combinations thereof.

Unless otherwise defined, all terms, including technical and scientific terms, used herein have the same meaning as commonly understood by one of ordinary skill in the art to which the invention belongs. Furthermore, terms as defined in commonly used dictionaries should be construed as having the same meanings as in an associated technical context. Moreover, unless explicitly defined in this application, the terms should not be construed in ideal or overly formal senses.

In addition, the following embodiments are provided to more completely describe the present invention to those of ordinary skill in the art, and shapes and sizes of components in the drawings may be exaggerated for clearer description.

Figure 1:
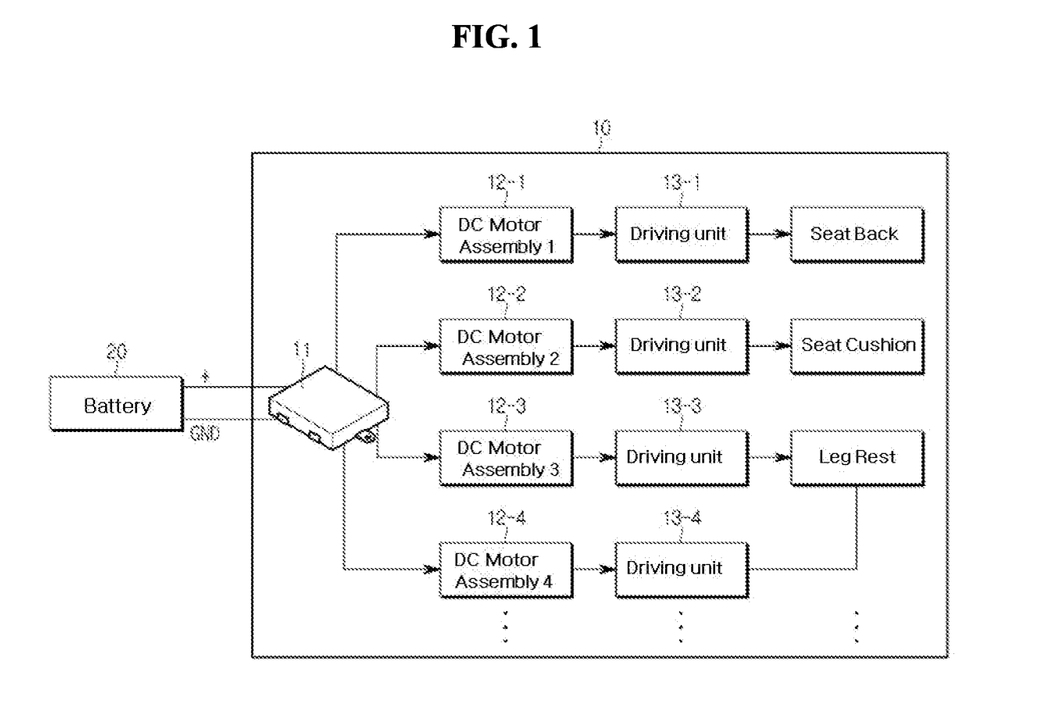
FIG. 1 is a diagram schematically showing a conventional power seat including a supervisory controller and a plurality of motor assemblies.

FIG. 1 is a diagram schematically showing a conventional power seat including a supervisory controller and a plurality of motor assemblies.

Referring to FIG. 1, in the conventional power seat 10, one supervisory controller 11 is disposed for each power seat 10, and the supervisory controller 11 is connected to the battery 20 of a vehicle. The supervisory controller 11 receives power from the battery 20, and transmits signals adapted to drive the respectively motor assemblies 12-1, 12-2, 12-3, and 12-4 via driving circuits provided in the supervisory controller 11. The motor assemblies 12-1, 12-2, 12-3, and 12-4 are also connected to respective driving units 13-1, 13-2, 13-3, and 13-4 that are members configured to transmit power for moving respective parts of the power seat 10.

In this case, the driving units 13-1, 13-2, 13-3, and 13-4 may be disposed on a frame constituting the skeleton of the power seat 10, and may have various forms. For example, the driving unit 13-1 configured to drive a seatback is a recliner device that receives power from the motor assembly 12-1. The driving unit 13-1 is connected to the frame of the seatback, and may perform the operation of tilting the seatback back at a predetermined angle or the operation of returning the tilted seatback to its original front position.

Furthermore, as an example, the driving unit 13-2 configured to drive a seat cushion is a relaxation device that receives power from the motor assembly 12-2. The driving unit 13-2 is connected to the frame of the seat cushion, and may perform the operation of lifting the seat cushion upward or the operation of returning the lifted seat cushion downward again. Meanwhile, the relaxation device may operate such that only the front side of the seat cushion is lifted upward by taking into consideration a passenger's comfortable posture.

Furthermore, as an example, the driving units 13-3, and 13-4 configured to drive a leg rest is a leg rest device and a leg rest extension device that receive power from the motor assemblies 12-3, and 12-4, respectively. The devices are connected to the frame of the leg rest, and may operate together to lift the leg rest while simultaneously extending the length of the leg rest forward.

It is known that the detailed operation structure of the conventional power seat 10 can be implemented via various types of power transmission members constituting the driving units 13-1, 13-2, 13-3, and 13-4. Accordingly, a description thereof is omitted here.

Meanwhile, as described above, the power seat 10 may be developed to move more parts in order to guide a passenger to a more comfortable sitting posture. Accordingly, the number of motors included in the power seat 10 may gradually increase.

Figure 2:
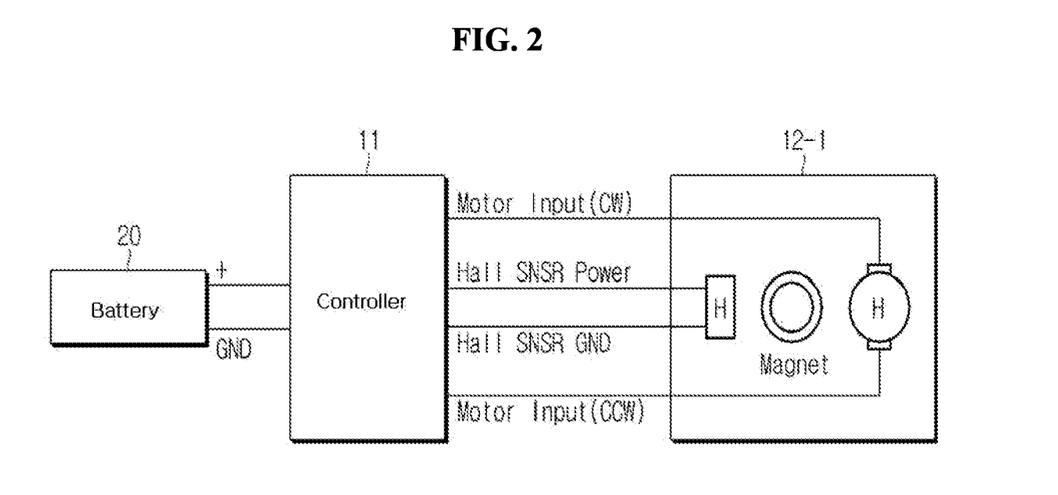
FIG. 2 is a diagram showing in more detail the connection lines between one of the motor assemblies shown in FIG. 1 and the supervisory controller.

FIG. 2 is a diagram showing in more detail the connection lines between one 12-1 of the motor assemblies 12-1, 12-2, 12-3, and 12-4 shown in FIG. 1 and the supervisory controller 11.

Referring to FIG. 2, in the case of a DC motor widely used for driving the conventional power seat 10, connection lines for the forward and reverse driving of the motor and connection lines for supplying power to a Hall sensor are required between the supervisory controller 11 and the one motor assembly 12-1. Accordingly, as the number of motors to be connected to the supervisory controller 11 is increased by one, the number of connecting lines is increased by four. When a BLDC motor is used to drive the power seat 10, there are required a total of eight connection lines, including three-phase connection lines U, V, and W and Hall sensor connection lines (two power connection lines, and three signal transmission lines for respective three phases). A driving circuit configured to control each motor also needs to be additionally provided in the supervisory controller 11. In other words, as the number of motors increases for passengers' convenience, problems arise in that the volume of a harness connecting the supervisory controller 11 and the motors increases excessively and the volume of the supervisory controller 11 itself increases.

An embodiment of a motor module according to the present invention that has been contrived to overcome these problems will be described below.

Figure 3:
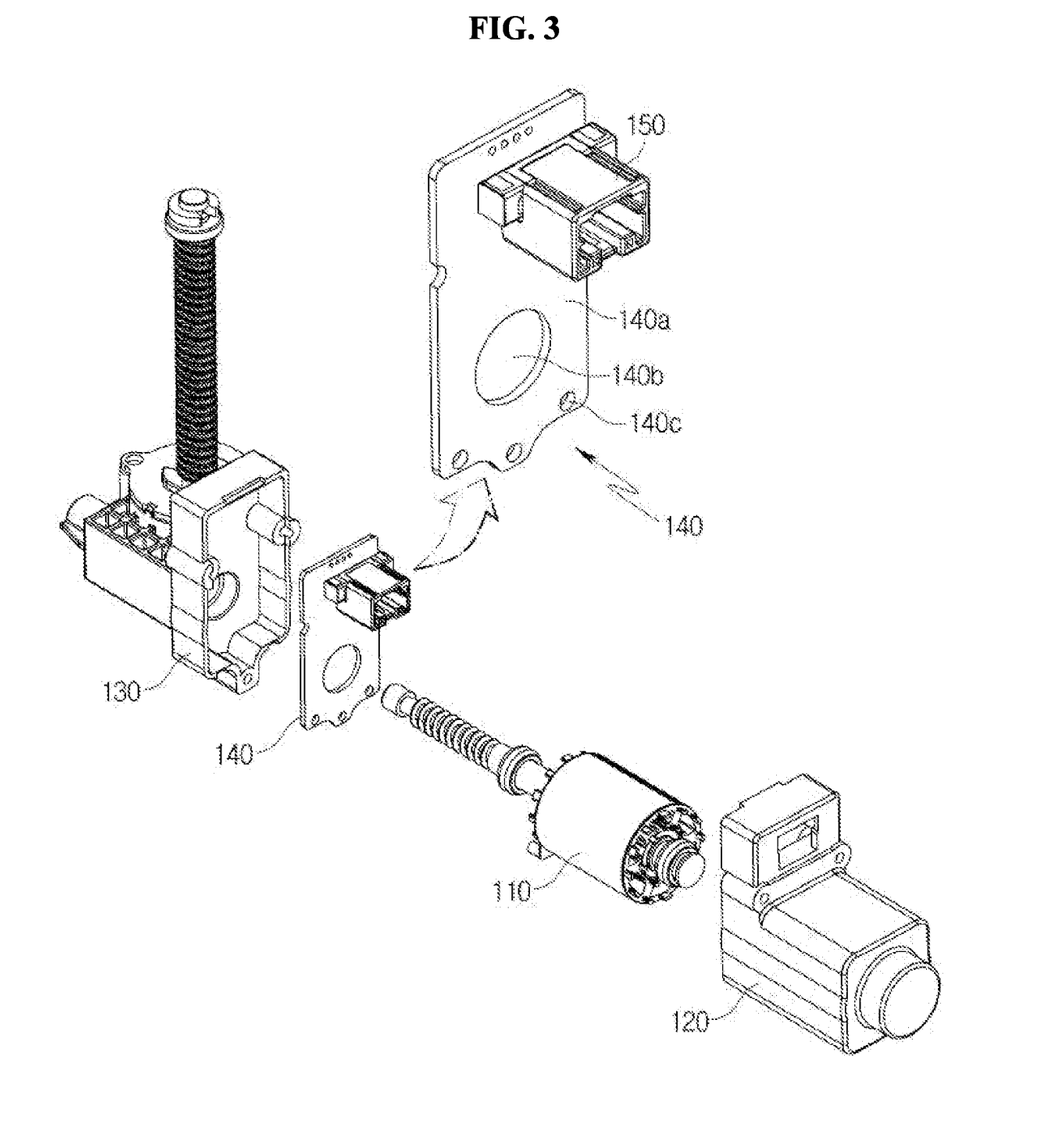
FIG. 3 is an exploded perspective view of a motor module according to an embodiment of the present invention.
Figure 4:
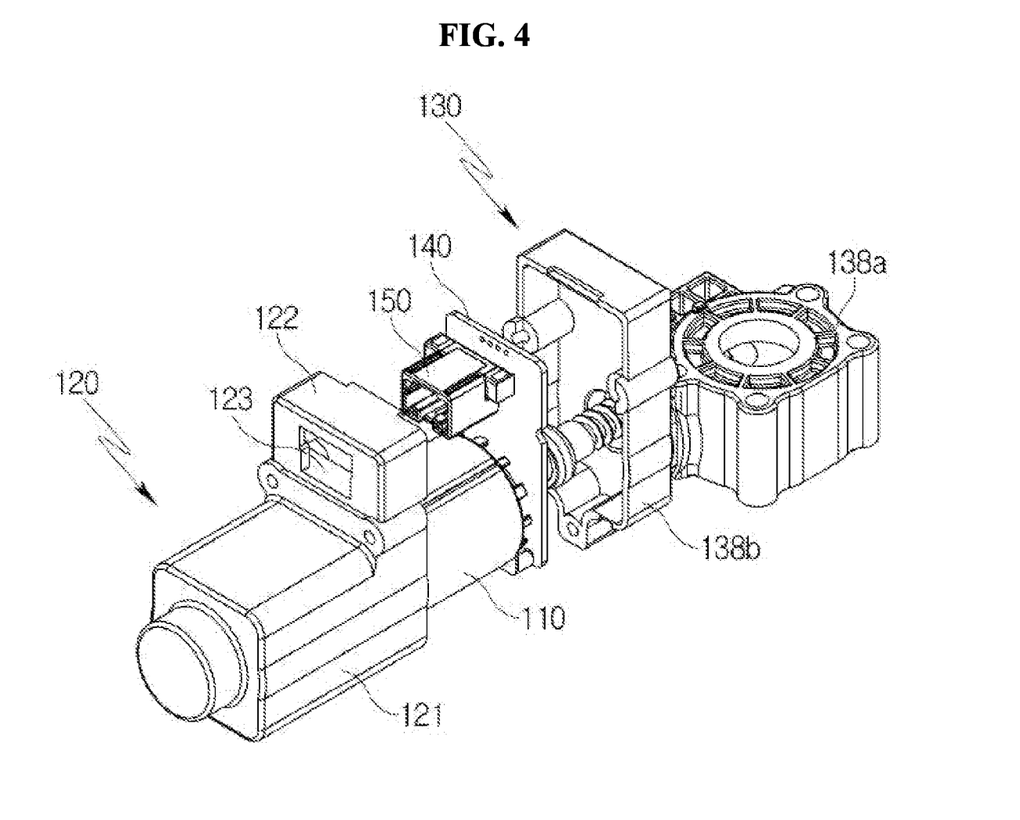
FIG. 4 is an enlarged view of a motor housing, a controller, and a power transmission unit included in the motor module of FIG. 3.

FIG. 3 is an exploded perspective view of a motor module 100 according to an embodiment of the present invention, and FIG. 4 is an enlarged view of a motor housing 120, a controller 140, and a power transmission unit 130 included in the motor module 100 of FIG. 3.

Referring to FIGS. 3 and 4, the motor module 100 according to an embodiment of the present invention may include a motor 110, the motor housing 120, the power transmission unit 130, and the controller 140.

The motor 110 may be rotated based on a control signal of the controller 140 included in the motor module 100. The rotational force generated by the rotation of the motor 110 is transmitted to the power transmission unit 130 to be described later so that individual parts of the power seat can be moved. In this case, the motor 110 may be preferably provided as a brushless DC (BLDC) motor. DC motors are used in most of the motor assemblies 12-1, 12-2, 12-3, and 12-4 that are used in the conventional power seat 10. When a power seat equipped with DC motors is used for a long period of time, there is a problem in that dust, noise, and vibration are generated because brushes are worn out due to the continuous contact between the brushes and electromagnets. When the motor module 100 according to an embodiment of the present invention is provided with a BLDC motor, there is an advantage in that the above-described problems do not occur.

The motor housing 120 is configured to accommodate the motor 110, and the shape thereof is not limited. More specifically, in the state in which all components of the motor module 100 are assembled together, the rotor and the stator of the motor 110 may be accommodated in the motor housing 120. At least a portion of the rotation shaft 111 of the motor connected to the rotor may be accommodated in the motor housing 120, and the other portion of the rotation shaft 111 may be connected to the power transmission unit 130 through the controller 140 to be described later or may constitute a part of the power transmission unit 130.

The motor housing 120 may include a main housing 121 and a connector housing 122.

The main housing 121 is configured such that a space is formed therein so that the motor 110 can be accommodated therein. For example, the main housing 121 may be formed in a rectangular parallelepiped shape having a volume in which the motor 110 is accommodated. The main housing 121 may have a long axis disposed parallel to the rotation shaft 111 of the motor 110 based on the state in which the motor 110 is accommodated.

The connector housing 122 is configured such that a connector 150 to be described later is accommodated and supported therein, and is connected to the main housing 121. More specifically, the connector housing 122 may be formed to protrude from the main housing 121 in a direction perpendicular to the longitudinal axis (long axis) of the main housing 121. The connector housing 122 may include a connector passage hole 123 that is formed in the long axis direction of the main housing 121 such that the connector 150 connected to the supervisory controller 300 can pass therethrough.

Figure 6:
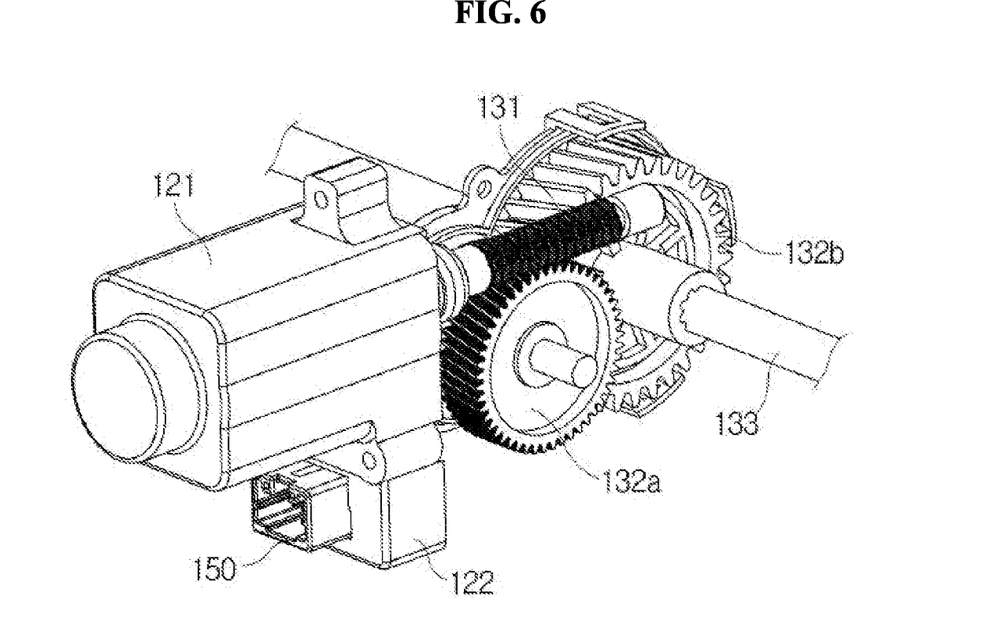
FIGS. 6 and 7 are views illustrating the location of a connector according to the shape of a power transmission unit.

In this case, in the state in which all components of the motor module 100 are assembled together, a part of the connector 150 may protrude through the connector passage hole 123 (see FIG. 6). In other words, the sectional area of the connector passage hole 123 may be formed to be larger than the sectional area of the connector 150 viewed from the direction in which it is connected to the supervisory controller 300.

Through this structure, the communication line 200 from the supervisory controller 300 and a power line from the battery of the vehicle may be easily connected to the connector 150. Since the connector housing 122 surrounds the connector 150, the connector 150 may be supported so as not to be removed from a coupled location even when the vehicle vibrates heavily while driving.

In addition, the connector housing 122 may be disposed at one end of the motor housing 120 in the longitudinal direction. More specifically, the connector housing 122 may be disposed at one end which is one of both ends of the motor housing 120 in the long axis direction and to which a gear box 138 to be described later is connected. In other words, one end of the connector housing 122 may be connected to the gear box 138 to be described later.

The power transmission unit 130 is connected to the motor 110 and is configured to transmit the rotational force of the motor 110 to the driving units 13-1, 13-2, 13-3, and 13-4 of the respective parts of the power seat in order to move the power seat disposed in the vehicle. More specifically, the power transmission unit 130 may be connected to the rotation shaft 111 of the motor 110 and receive the rotational force of the motor 110. The power transmission unit 130 may include various types of gears. In this case, the gears may be provided and arranged to increase the force transmitted to the driving units 13-1, 13-2, 13-3, and 13-4 by reducing the rotational speed of the motor 110 or to change the rotational direction of the motor 110.

The power transmission unit 130 may include the gear box 138 and a gear assembly. Some components of the gear assembly may be accommodated in the gear box 138, and some other components of the gear assembly may be connected to the internal components of the gear box 138, may be disposed to be exposed to the outside of the gear box 138, and may be connected to the driving units 13-1, 13-2, 13-3, and 13-4.

The gear box 138 may be connected to the motor housing 120 at one end thereof, and may have various shapes depending on the shape of the gear assembly accommodated in the gear box 138. The gear box 138 includes a first gear box 138a configured such that some components of the gear assembly are accommodated therein, and a second gear box 138b connected to the first gear box 138a on one side thereof and both the main housing 121 and the connector housing 122 on the other side thereof. The second gear box 138b may be coupled to the main housing 121 and the connector housing 122 with the controller 140 interposed therebetween in order to surround and protect the motor controller 140 together with the motor housing 120.

The controller 140 is configured to control the rotation of the motor 110, and may be disposed between the motor 110 and the power transmission unit 130. In this case, the controller 140 includes a micro controller unit(MCU) 141 configured to control the rotation of the motor 110, an inverter 142 configured to receive a driving signal from the MCU 141 and drive the motor 110, and a power supply unit 143 configured to receive power from the battery 20 of the vehicle and provide it to the MCU 141. Since the controller 140 is included in the motor module 100, the roles of the electronic controller unit (ECU) 11 and the inverter 142 that are conventionally embedded in a separate housing outside the motor assembly and control each motor may be integrated into the motor module 100.

More specifically, referring to FIG. 4, the controller 140 may be disposed at a location where the connector housing 122 and the main housing 121 are coupled to the gear box 138. The connector 150 may be coupled to the controller 140. In this case, the connector 150 is configured to connect the supervisory controller 300 configured to receive a driving command for the power seat and the controller 140 embedded in the motor module 100.

Meanwhile, the connector 150 may be detachably coupled to the controller 140. When the motor housing 120 is fastened to the gear box 138 with the controller 140 interposed therebetween in the state in which the connector 150 is coupled to the controller 140, the connector 150 is supported by the connector housing 122.

Conventionally, a connector configured to electrically connect the motor assemblies 12-1, 12-2, 12-3, and 12-4 and the supervisory controller 11 is provided in a housing made of a plastic material. This structure is a structure in which the housing and the connector are integrated with each other, in which case an electric wiring connected to the terminals of the connector and motors is present inside the housing. In this case, when a defect occurs in plastic injection, there is a problem in that vibration and noise are generated due to motor driving. Furthermore, a problem may occur in the connector terminal depending on the injection defect, in which case the overall part needs to be replaced together with the housing integrated with the connector and the electrical wiring disposed inside the housing.

In contrast, when the connector 150 is detachably coupled to the controller 140 as in an embodiment of the present invention, the problem of the above-described injection defect does not occur. Accordingly, a concern about the occurrence of vibration and noise is reduced. Even when a defect occurs in the connector 150, the replacement of other parts is unnecessary if the connector 150 itself is replaced, so that there is an economical advantage the maintenance of the motor module 100.

Meanwhile, the controller 140 may include a printed circuit board (PCB) substrate 140a on which circuit elements constituting the above-described MCU 141, inverter 142, and power supply unit 143 are mounted.

A rotation shaft passage hole 140b through which the rotation shaft 111 of the motor 110 can pass may be provided in the PCB substrate 140a. More specifically, the motor 110 includes a stator 113 including a core 1131 on which a three-phase coil is wound, and a rotor 115 including a magnet, disposed inside the stator 113, and configured to rotate relative to the stator 113. Furthermore, the rotation shaft 111 may be disposed inside the rotor 115. The rotation shaft 111 is coupled while forming a coaxial axis with the rotor 115, and one side of the rotation shaft 111 in the longitudinal direction may be coupled to the power transmission unit 130. The rotation shaft passage hole 140b may be disposed at a location corresponding to the rotor 115 based on the state in which the controller 140 and the motor 110 are connected, and may be machined in the form of a circular hole passing through the PCB substrate 140*a* to correspond to the size of the rotor 115. In other words, the controller 140 and the motor 110 are coupled while the rotation shaft 111 of the motor 110 passes through the rotation shaft passage hole 140*b* of the controller 140. When the motor 110 is driven and thus the rotation shaft 111 is rotated, a rotational force is transmitted to the power transmission unit 130.

Referring to the locational relationship in which the motor 110, the controller 140, and the power transmission unit 130 are coupled, the controller 140 is disposed between the stator 113 (and the rotor 115) of the motor 110 and the power transmission unit 130, and the rotation shaft 111 of the motor 110 is disposed while passing through the rotation shaft passage hole 140*b* formed in the controller 140. In this case, the length of the motor housing 120 may be formed to completely accommodate the stator 113 and rotor 115 of the motor 110. The controller 140 may be disposed in the vicinity of a coupling portion where the motor housing 120 and the power transmission unit 130 are coupled. A portion of the rotation shaft 111 of the motor 110 may be accommodated in the motor housing 120, and the other portion thereof may be accommodated in the gearbox 138 of the power transmission unit 130.

Figure 8:
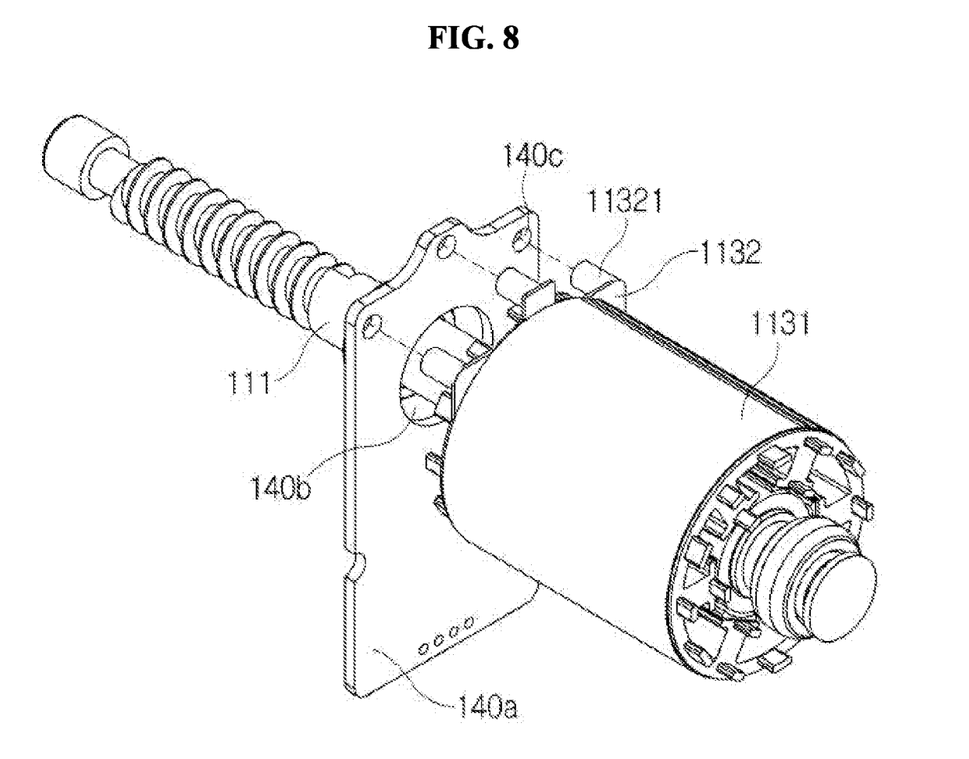
FIG. 8 is a view showing the motor coupling holes of a controller and the coupling protrusions of a motor fitted into the motor coupling holes.

Meanwhile, a plurality of motor coupling holes 140*c* configured to physically couple the motor 110 and the controller 140 may be provided in the PCB substrate 140*a*. Furthermore, a plurality of coupling protrusions 11321 may be formed to protrude in the direction in which the controller 140 is disposed at one end of the stator 113 in the longitudinal direction close to the controller 140. More specifically, the plurality of coupling protrusions 11321 may be formed to protrude from an upper bobbin 1132, which is an insulator made of a plastic material assembled to surround the core 1131 of the stator 113 (for convenience, one side of the motor 110 close to the controller 140 is referred to as an upward direction).

In this case, the number of motor coupling holes 140*c* (three in the embodiment of FIG. 8) is the same as the number of coupling protrusions 11321 (three in the embodiment of FIG. 8). The locations of the motor coupling holes 140*c* may be opposite to those of the coupling protrusions 11321 on the state in which the controller 140 and the motor 110 are coupled (see FIG. 8). In other words, the controller 140 may be connected to the plurality of coupling protrusions 11321 through the motor coupling holes 140*c*.

Figure 9:
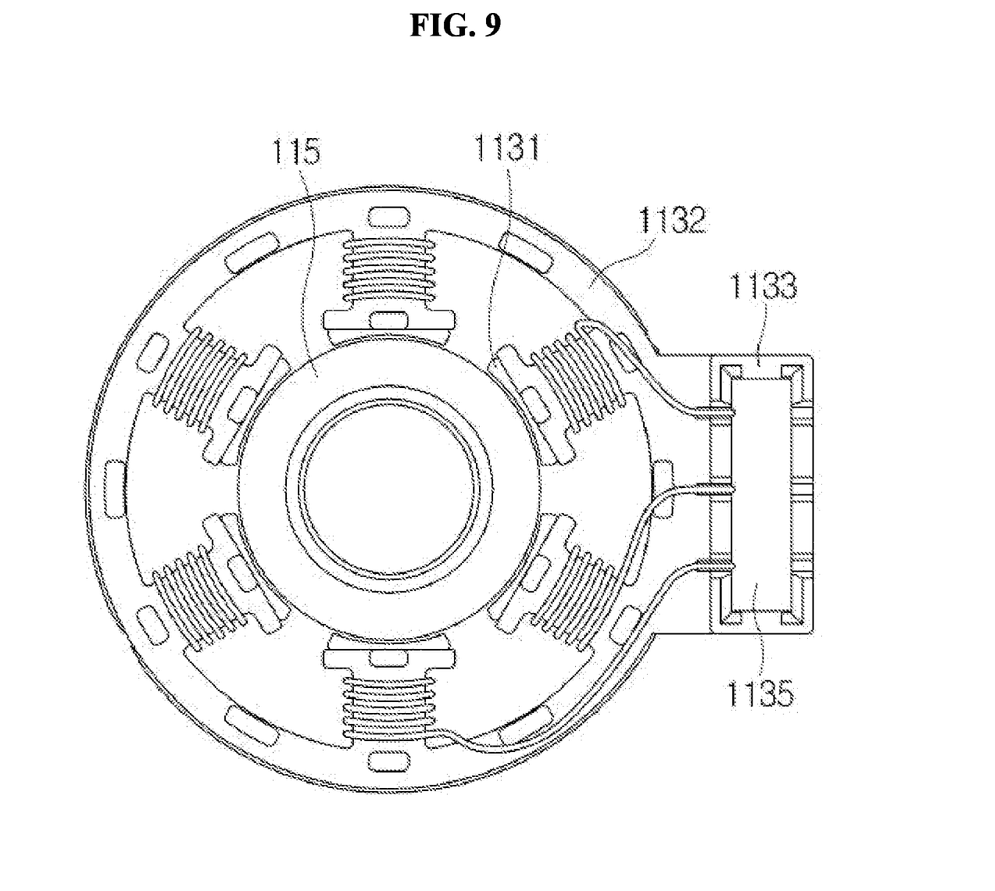
FIG. 9 is a view showing a state in which a common terminal is combined with a neutral point assembly part.
Figure 10:
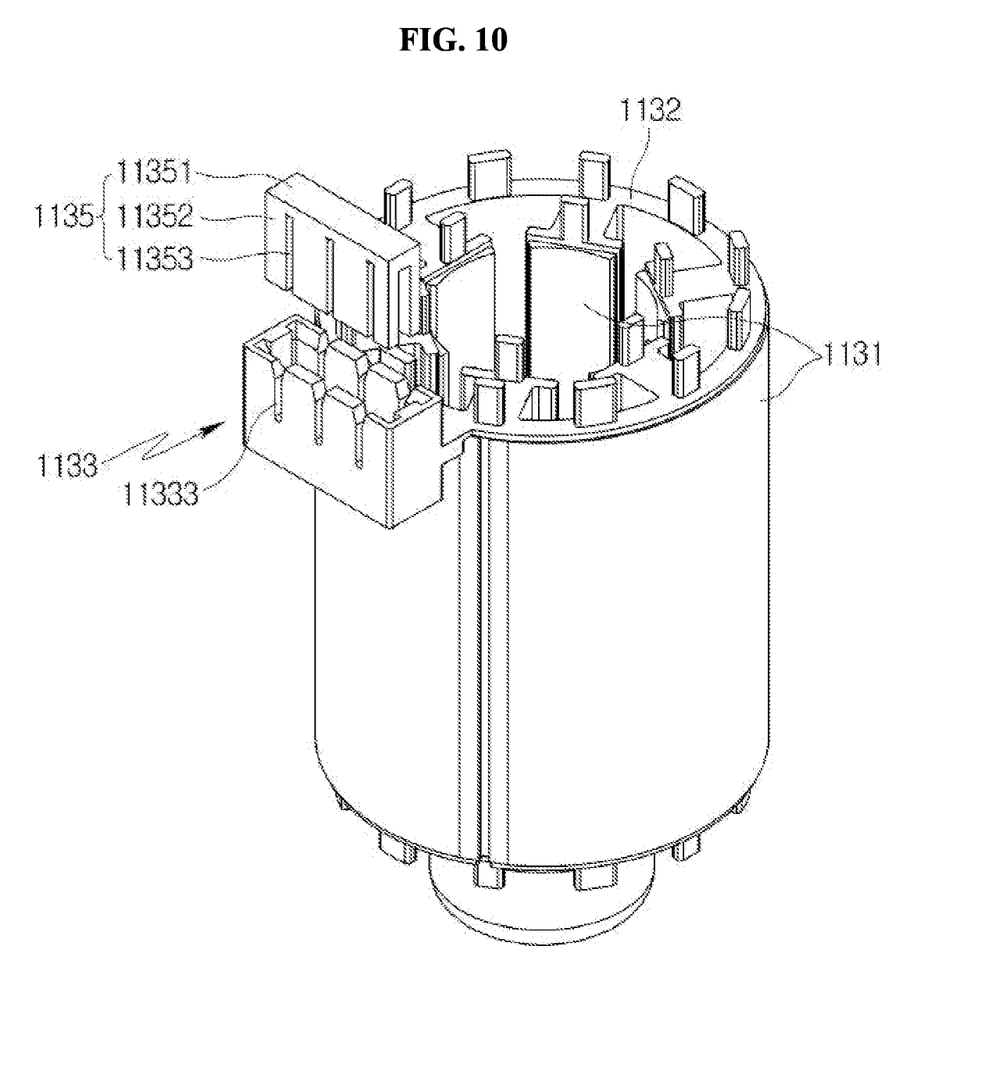
FIG. 10 is a view showing a state in which the neutral point assembly part and the common terminal are separated from each other.
Figure 11:
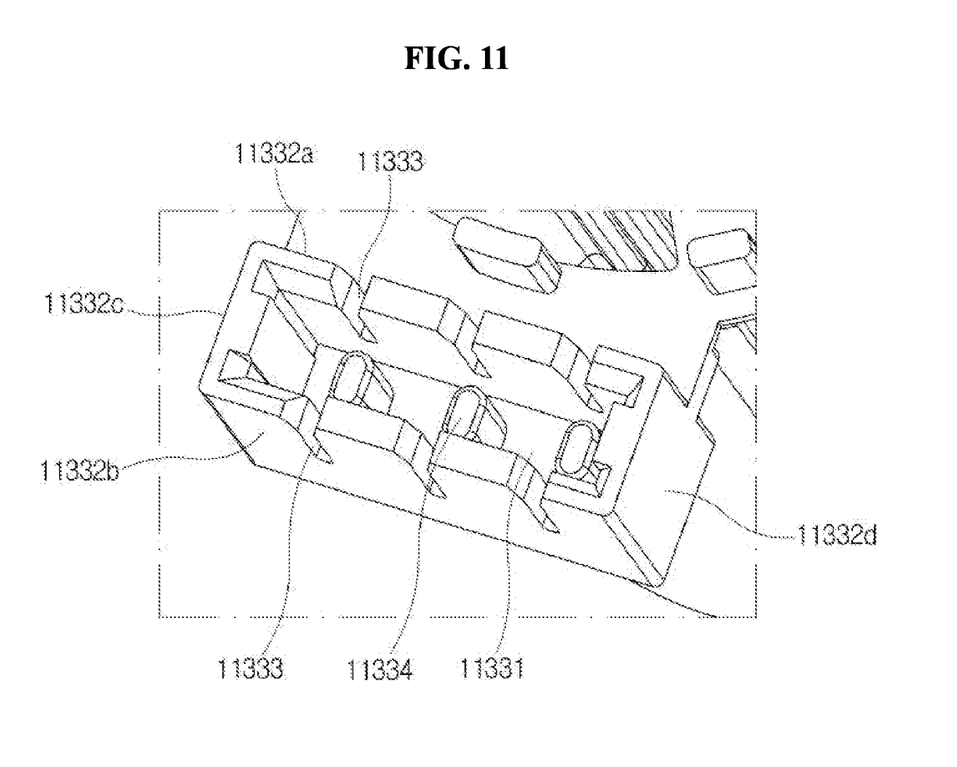
FIG. 11 is an enlarged view of the structure of the neutral point assembly part.

FIG. 9 is a view showing a state in which a common terminal is combined with a neutral point assembly part, FIG. 10 is a view showing a state in which the neutral point assembly part and the common terminal are separated from each other, and FIG. 11 is an enlarged view of the structure of the neutral point assembly part.

Referring to FIGS. 9 to 11, a neutral point assembly part 1133 configured to assemble neutral points of a three-phase winding may be connected to one end of the stator 113 in the longitudinal direction. The neutral point assembly part 1133 may be formed to extend from the upper bobbin 1132. The neutral point assembly unit 1133 may be disposed at one of the longitudinal ends of the stator 113 that is closer to the controller 140, and the stator 113 may be formed to protrude outward in the radial direction.

More specifically, the neutral point assembly part 1133 may be formed in the shape of a cuboid having a space formed therein. The neutral point assembly part 1133 includes a flat bottom surface 11331 and an outer wall 11332 extending from the bottom surface 11331, and the top surface facing the bottom surface 11331 may be configured in an open form so that a common terminal 1135 can be inserted thereinto. The outer wall 11332 includes a first outer wall 11332*a* disposed close to the rotation shaft 111 of the motor 110, a second outer wall 11332*b* disposed to face the first outer wall 11332*a*, and a third outer wall 11332*c* and a fourth outer wall 11332*d* disposed between the first outer wall 11332*a* and the second outer wall 11332*b*.

In addition, arrangement slits 11333 may be formed in each of the first outer wall 11332*a* and the second outer wall 11332*b* so that the neutral wires can pass therethrough and be disposed inside the neutral point assembly part 1133. The three arrangement slits 11333 may be provided in the first outer wall 11332*a* and the second outer wall 11332*b* at predetermined intervals so that neutral wires for three phases are arranged therethrough. In addition, the arrangement slits 11333 may be formed by forming slits through the first outer wall 11332*a* and the second outer wall 11332*b* at a predetermined depth from the open top surface toward the bottom surface 11331.

Meanwhile, the neutral point assembly part 1133 may further include protruding pins 11334 is connected to the bottom surface 11331 and formed to protrude upward from the bottom surface 11331. The three protrusion pins 11334 may be provided to correspond to the arrangement slits 11333. The individual protruding pins 11334 are spaced apart by the spacing of the arrangement slits 11333, and the level of the top surfaces of the protruding pins 11334 may be flush with the depth of the arrangement slits. Although the protruding pins 11334 are shown in the shape of an elliptical column in the embodiment of FIG. 11, they may be provided in the shape of a circular column or a square column, and the shape is not particularly limited.

The neutral wires for respective three phases may be drawn out from the teeth of the stator 113, may be inserted into the arrangement slits 11333, may be placed inside the neutral point assembly part 1133, and may be assembled in such a manner that they are pressed through the one common terminal 1135 provided separately, so that a three-phase connection can be achieved.

In this case, the common terminal 1135 may be made of a conductive material, and may include a first terminal part 11351 and a second terminal part 11352. The first terminal part 11351 may be formed in the shape of a rectangular flat plate, and the second terminal part 11352 may include a plurality of protrusions protruding from the first terminal part 11351 by a predetermined length. The length of the plurality of protrusions may be formed to be longer than the depth of the arrangement slits 11333. The plurality of protrusions is spaced apart by a predetermined distance, and thus forms spacing slits 11353. When the common terminal 1135 is fitted and coupled to the neutral point assembly part 1133, the spacing slits 11353 and the arrangement slits 11333 may be arranged alongside each other. In other words, the spacing between the individual spacing slits 11353 and the spacing between the individual arrangement slits 11333 may be substantially the same.

In the process of assembling neutral points according to an embodiment of the present invention, first, neutral wires for respective three phases are inserted to and passed through the arrangement slits 11333 and then disposed inside the neutral point assembly part 1133. In this state, the first terminal portion 11351 of the common terminal 1135 is compressed by pressing it with a press so that it is compressed onto the protruding pins 11334. Through this, the individual neutral wires may be electrically coupled via the common terminal 1133, and thus a neutral point connection is achieved.

Conventionally, a method of performing the three-phase neutral point connection of a motor in a controller or a method of soldering individual phase wires to each other is employed. When a neutral point connection is performed in the controller, the controller needs a space for the neutral point connection, so that there is a problem in that the size of the controller increases. When wires for respective phases are connected through soldering in a motor, there is a risk that the soldered coil may move inside the motor, resulting in a short-circuit failure or an open failure.

In contrast, when a neutral point connection is performed in such a manner that the neutral wires for respective phases are placed in the neutral point assembly part 1133 provided in the stator 113 of the motor 110 and then pressed with the separate common terminal 1135, as in an embodiment of the present invention, there is an advantage that the above-described problems do not occur. In other words, in the neutral point assembly structure such as that in the embodiment of the present invention, the controller does not require the space for a neutral point connection, so that the size of the controller can be minimized. In addition, it may be possible to prevent a short failure and an open failure that may occur in the neutral point connection performed by the soldering method.

Figure 5:
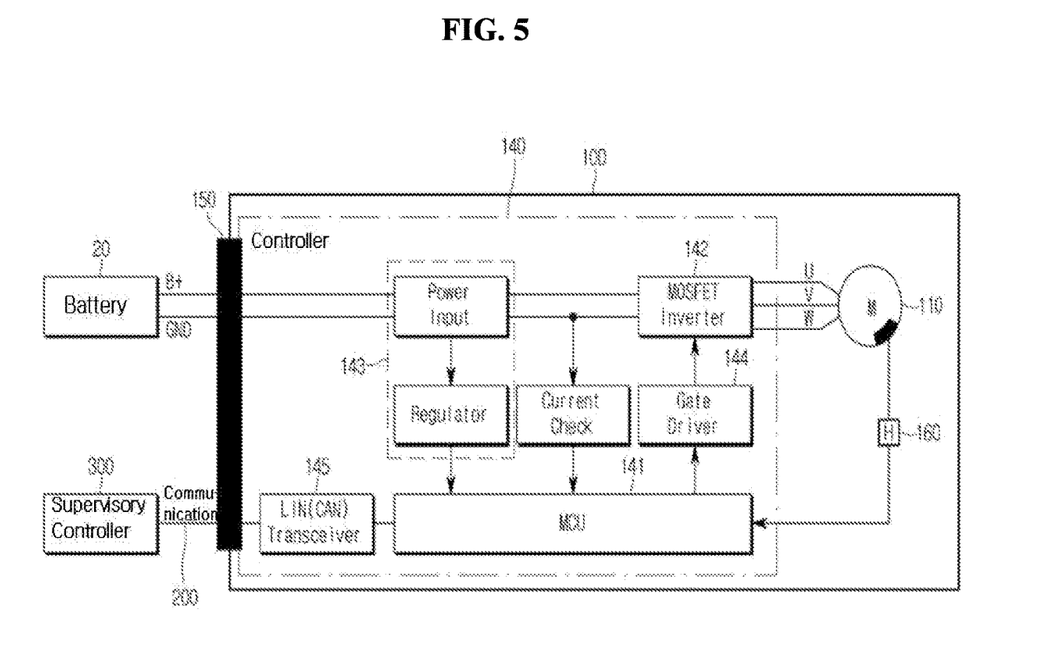
FIG. 5 is a block diagram of a motor module including the controller of FIG. 3.

FIG. 5 is a block diagram of the motor module 100 including the controller 140 of FIG. 3.

The individual components of the internal block diagram of the controller 140 shown in FIG. 5 may be implemented as a plurality of circuit elements, and the plurality of circuit elements may be mounted on the PCB substrate 140a.

The MCU 141 may transmit a control signal to a gate driver 144 that sends a driving signal to the motor 110. The MCU 141 may receive information related to the movement of the power seat from the supervisory controller 300 while communicating with the supervisory controller 300 via a communication unit 145 to be described later. The operating power of the MCU 141 may be applied by the power supply unit 143.

The inverter 142 may be connected to the gate driver 144 and the motor 110, and may receive a driving signal from the gate driver 144 and drive the motor 110. The inverter 142 may include a plurality of semiconductor switching elements configured to be selectively turned on and off to convert the DC power of the vehicle battery 20 into alternating current (AC) and sequentially apply current to individual phases of the motor 110. The driving signal from the gate driver 144 refers to a switching signal adapted to selectively turn on and off at least one semiconductor switching element among the plurality of semiconductor switching elements.

The power supply unit 143 may be connected to the battery 20 through the connector 150. The power supply unit 142 may appropriately distribute the power fed from the battery 20 by using a regulator, and may then apply the distributed power to components requiring driving power, such as the MCU 141, the gate driver 144, and a hall sensor 160 to be described later, as operating power. Furthermore, the power supply unit 143 may supply power, transmitted from the battery 20, to the motor 110 through the inverter 142.

The motor module 100 may be directly connected to the battery 20. In conventional technology, when the supervisory controller 11 outside the motor assembly 12-1 is connected to the battery 20 and is applied with power, the power distributed from the supervisory controller 11 is supplied to the hall sensor of the motor assembly 12-1, and thus there is a problem in that the volume of the harness connected between the supervisory controller 11 and the motor assembly 12-1 is excessively large (see FIG. 2). In contrast, when the motor module 100 is directly connected to the battery 20 as in an embodiment of the present invention, there is no need for a connection line for supplying power to the controller 140 in the harness between the supervisory controller 300 and the motor module 100, and thus there is an advantage in that the volume of the harness can be reduced.

The motor module 140 may further include a communication unit 145 configured to receive a command input from the supervisory controller 300.

The supervisory controller 300 and the controller 140 inside the motor module 100 may be connected only over the communication line 200. The communication unit 145 may include one or more communication modules to receive a command from the supervisory controller 300. For example, the communication module may perform controller area network (CAN) communication or local interconnect network (LIN) communication. The communication unit 145 may be embedded in the MCU 141.

The motor module 100 according to an embodiment of the present invention may further include the Hall sensor 160. More specifically, the Hall sensor 160 is configured to detect the rotational location of the rotor. The Hall sensor 160 is a sensor using the Hall effect that appears in all conductive materials an electric current and a magnetic field. The Hall sensor 160 may convert the voltage applied perpendicular to the direction of a current and a magnetic field into a digital signal and output the digital signal when the magnetic field is applied perpendicular to an electric conductor through which the current flows. The Hall sensor 160 may include a Hall element and an integrated circuit configured to perform digital signal processing. Power may be applied from the power supply unit 143 of the controller 140 so that current may flow through the Hall sensor 160. A signal related to the location of the rotor output from the hall sensor 160 may be input to the MCU 141. When the MCU 141 transmits a control signal to the gate driver 144 based on the above signal, the gate driver 144 may transmit a driving signal adapted to drive the motor 110 to the inverter 142.

Meanwhile, when the conventional supervisory controller 11 is provided as a separate configuration without being integrated with the motor assembly 12-1, a connection line configured to apply power to the Hall sensor is included in the harness between the upper controller 11 and the motor assembly 12-1 (see FIG. 2).

However, since the motor module 100 according to an embodiment of the present invention is configured such that the power supply unit 143 is provided in the controller 140 integrated into the motor module 100 and the power supply unit 143 applies the power received from the battery 20 to the Hall sensor 160, there is no need for a connection line configured to apply power to the Hall sensor 160 to be present between the host controller 300 and the motor module 100. In other words, there is an advantage in that the volume of the harness between the supervisory controller 300 and the motor module 100 can be reduced.

In addition, the supervisory controller 300, which is repeatedly referred to in this specification, is an integrated controller that controls all seats disposed in a vehicle in an integrated manner. The supervisory controller 11, which was conventionally provided for each seat, no longer needs to be present because the driving circuit of each motor is integrated with the motor module 100. The supervisory controller 300 according to an embodiment of the present invention performs the role of transmitting only a control signal to control the controllers 140 embedded in the motor module 100 in an integrated manner. That is, in an embodiment of the present invention, the controller 140 means a slave controller. The upper controller 300 may be understood as meaning a master controller that controls a plurality of slave controllers in an integrated manner.

In this case, since the supervisory controller 300 does not need to include a driving circuit (a gate driver, an inverter, etc.) for driving the motor, the volume of the supervisory controller 300 does not increase even when the number of motors for driving the seat increases. The supervisory controller 300 may receive a passenger's intention to move a seat through a user interface such as a seat button, and may transmit a digital signal, i.e., a control signal, to the motor module 100 to be operated over the communication line 200.

In other words, the controller 140 embedded in the motor module 100 is connected to the supervisory controller 300 through the connector 150 only over the communication line 200. Furthermore, the controller 140 is directly connected to the battery 20. In other words, a circuit line connected to the battery 20 and the communication line 200 connected to the supervisory controller 300 are coupled to the connector 150. According to this structure, the circuit line for supplying power and the communication line 200 for transmitting a control signal do not need to be integrated into one harness. Accordingly, there is an advantage in that when a failure occurs in any one part, it is easy to identify the defective part and easy to replace it.

Figure 7:
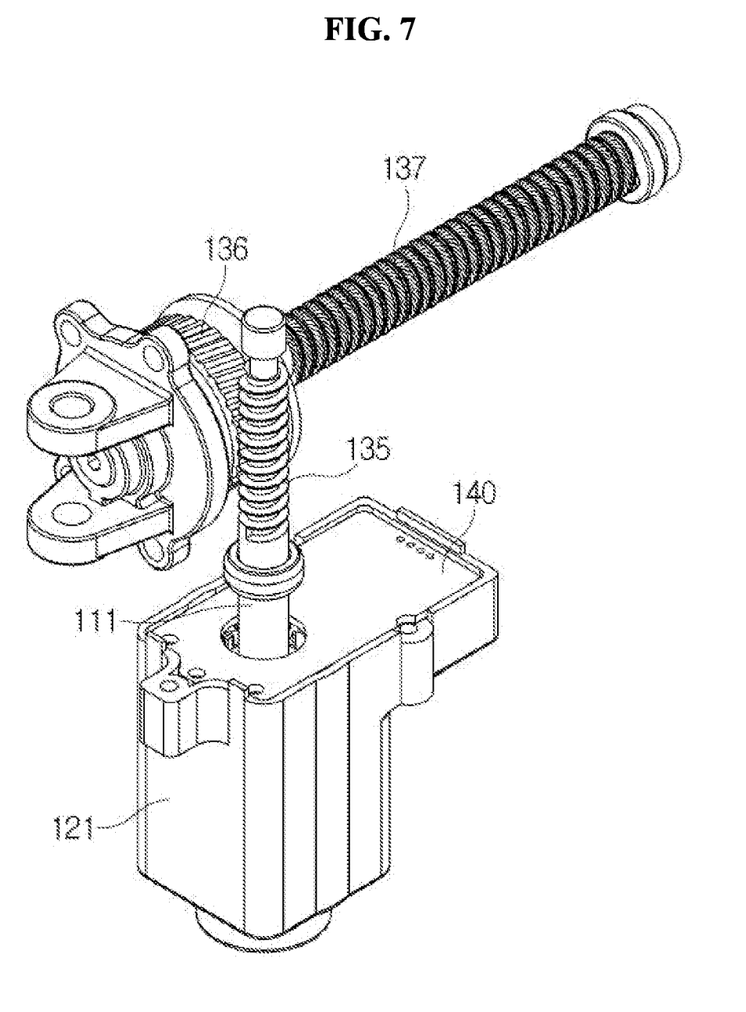

FIGS. 6 and 7 are views illustrating the location of the connector 150 according to the shape of the power transmission unit 130. In order to illustrate the shape of a gear assembly, the gear box 138 of the power transmission unit 130 is shown as being removed in FIGS. 6 and 7.

As described above, the power transmission unit 130 may include a gear assembly. The gear assembly may be implemented in various forms depending on the configuration of a power seat to be manipulated.

For example, referring to FIG. 6, the gear assembly may be formed in a first shape. The gear assembly having the first shape may include a first shaft 131 extending from the rotation shaft 111 of the motor 110 and having a thread, and a first cylindrical gear 132*b* connected to the first shaft 131 having the thread formed therein. In this case, the gear assembly having the first shape may further include a power transmission shaft 133 that is connected to the first cylindrical gear 132*b* and is rotationally driven together when the first cylindrical gear 132*b* is rotated. Meanwhile, a worm wheel 132*a* may be connected between the first shaft 131 and the first cylindrical gear 132*b* so that the first shaft 131 and the worm wheel 132*a* may form a worm gear structure. The power transmission shaft 130 is connected to separate driving members, and may transmit the rotational force of the motor 110 to at least one of the driving units 13-1, 13-2, 13-3, and 13-4 that move parts of the power seat.

Alternatively, as an example, referring to FIG. 7, the gear assembly may be formed in a second shape. The gear assembly having the second shape may include a second shaft 135 extending from the rotation shaft 111 of the motor 110 and having a thread, and a second cylindrical gear 136 connected to the second shaft 135 having the thread formed therein. In this case, the gear assembly having the second shape may further include a lead screw 137 that is connected to the second cylindrical gear 136 and moves linearly when the second cylindrical gear 136 is rotated. The lead screw 137 may be connected to separate driving members (not shown), and may apply the rotational force of the motor 110 to at least any one of the driving units 13-1, 13-2, 13-3, and 13-4 that move parts of the power seat.

Meanwhile, in the motor module 100 according to an embodiment of the present invention, when the power transmission unit 130 has the first shape, the connector 150 may be disposed to correspond to the direction in which the first cylindrical gear 132*b* is disposed with respect to the first shaft 131.

In addition, in the motor module 100 according to an embodiment of the present invention, when the power transmission unit 130 has the second shape, the connector 150 may be disposed to correspond to the axial direction in which the lead screw 137 moves linearly.

In other words, depending on the shape of the gear assembly included in the power transmission unit 130, the connector 150 may be disposed toward the most protruding configuration of the gear assembly. Through this configuration, there is an advantage in that there is no concern of structural interference between the connector 150 and the frame of the power seat. In other words, no matter what shape the frame of the power seat has, the direction in which the connector 150 is disposed to protrude is directed to the direction in which the gear assembly 100 protrudes, so that the connector 150 and the frame do not interfere with each other. The motor module 100 according to an embodiment of the present invention may be applied to power seat frames having various shapes.

As described above, according to an embodiment of the present invention, the controller including the driving circuit configured to control the motor is integrated into the motor module, so that there is no need to provide a controller for each vehicle seat. Accordingly, even when the number of motors configured to control a power seat increases, an arrangement space for the vehicle seat may be advantageously utilized.

Furthermore, according to an embodiment of the present invention, the supervisory controller configured to control all vehicle seats, including first-row seats including a driver's seat and a front passenger's seat and rear seats including second-row seats and other rear seats, is connected to all motors included in all the vehicle seats only over communication lines, so that even when the number of motors for controlling seats increases, the burden of an increase in the volume of a harness may be minimized.

Furthermore, the motor module according to an embodiment of the present invention is applicable to seat frames having various shapes because the connector connected to the supervisory controller is disposed to correspond to the location of the most protruding configuration of the power transmission unit, so that there is no concern about structural interference between the connector and the seat frame.

Furthermore, in the present invention, the size of the controller may be minimized because neutral points for three phases are connected by pressing and assembling them to the common terminal via the neutral point assembly part provided in the motor without connecting them in the controller.

Moreover, the present invention may prevent a short failure or an open failure that may occur due to poor soldering because neutral points for three phases are connected by pressing and assembling them to the common terminal via the neutral point assembly part provided in the motor without connecting them through soldering in the motor.

Although the present invention has been described with reference to the limited embodiments and drawings, the present invention is not limited to the above-described embodiments, but various modifications and variations may be made by those of ordinary skill in the art to which the present invention pertains from the description. Therefore, the technical spirit of the present invention should be understood only by the claims, and all equivalent modifications thereof will fall within the scope of the technical spirit of the present invention.

What is claimed is:

1. A controller-integrated driving motor module comprising:
   a motor;
   a motor housing configured to accommodate the motor therein;
   a power transmission connected to the motor, and configured to transmit a rotational force of the motor to each part of a power seat for movement of the power seat disposed in a vehicle; and
   a controller disposed between the motor and the power transmission, and configured to control rotation of the motor,
   wherein the controller comprises a micro-controller unit (MCU) configured to control rotation of the motor, an inverter configured to receive a driving signal from the MCU and drive the motor, and a power supply unit configured to receive power from a battery of the vehicle and provide the power to the MCU.

2. The controller-integrated driving motor module of claim 1, further comprising a connector configured to connect the controller to a supervisory controller that receives a driving command for the power seat,
   wherein the connector is detachably coupled to the controller, and
   wherein the controller is connected to the supervisory controller through the connector only over a communication line.

3. The controller-integrated driving motor module of claim 2,
   wherein the motor comprises:
   a stator, including a core configured such that three-phase coils are wound thereon;
   a rotor including a magnet, disposed inside the stator and configured to rotate relative to the stator; and
   a rotation shaft disposed inside the rotor,
   wherein the controller has a printed circuit board (PCB) on which circuit elements constituting the MCU, the inverter, and the power supply unit are mounted,
   wherein the PCB has:
   a rotation shaft passage hole having a size corresponding to that of the rotor, the rotation shaft passage hole being configured to have the rotation shaft pass therethrough; and
   a plurality of motor coupling holes configured to be coupled to the motor, and
   wherein the controller is connected to a plurality of coupling protrusions disposed on one end of the stator through the plurality of motor coupling holes.

4. The controller-integrated driving motor module of claim 2, wherein the motor housing comprises:
   a main housing configured to accommodate the motor therein; and
   a connector housing protruding from the main housing in a direction perpendicular to a longitudinal axis of the main housing, the connector housing being configured such that the connector is accommodated and coupled therein.

5. The controller-integrated driving motor module of claim 2, wherein the power transmission has:
   a first configuration including:
   a first shaft extending from a rotation shaft of the motor and having a thread of the first shaft defined thereon,
   a first cylindrical gear connected to the first shaft having a thread of the first cylindrical gear, and
   a power transmission shaft connected to the first cylindrical gear and configured to rotate together when the first cylindrical gear is rotated; or
   a second configuration including:
   a second shaft extending from the rotation shaft of the motor and having a thread of the second shaft defined therein,
   a second cylindrical gear connected to the second shaft having a thread of the second cylindrical gear, and
   a lead screw connected to the second cylindrical gear and configured to linearly move when the second cylindrical gear is rotated.

6. The controller-integrated driving motor module of claim 5, wherein the connector is disposed:
   when the power transmission has the first configuration, to correspond to a direction in which the first cylindrical gear is disposed with respect to the first shaft; or
   when the power transmission has the second configuration, to correspond to an axial direction in which the lead screw moves linearly.

7. The controller-integrated driving motor module of claim 1, wherein:
   the motor includes a stator on which a plurality of three-phase wires are wound;
   a neutral point assembly part protruding outward in a radial direction of the stator is connected to one end of the stator in a longitudinal direction; and
   neutral lines, each of which corresponds to each of the plurality of three-phase wires, are inserted into the neutral point assembly part to be compressed and assembled through one common terminal.

* * * * *